(12) United States Patent
Zhang

(10) Patent No.: US 11,991,182 B2
(45) Date of Patent: *May 21, 2024

(54) OPTIMIZING RESOURCE UTILIZATION

(71) Applicant: Truist Bank, Charlotte, NC (US)

(72) Inventor: Zheng Zhang, Raleigh, NC (US)

(73) Assignee: TRUIST BANK, Charlotte, NC (US)

( * ) Notice: Subject to any disclaimer, the term of this patent is extended or adjusted under 35 U.S.C. 154(b) by 262 days.

This patent is subject to a terminal disclaimer.

(21) Appl. No.: 17/718,695

(22) Filed: Apr. 12, 2022

(65) Prior Publication Data

US 2023/0328069 A1   Oct. 12, 2023

(51) Int. Cl.
*H04L 9/40* (2022.01)
*G06N 20/10* (2019.01)

(52) U.S. Cl.
CPC ........... *H04L 63/102* (2013.01); *G06N 20/10* (2019.01); *H04L 63/08* (2013.01)

(58) Field of Classification Search
CPC ....... H04L 63/102; H04L 63/08; G06N 20/10; G06N 3/0464; G06N 3/082; G06N 3/063; G06N 3/0985
See application file for complete search history.

(56) References Cited

U.S. PATENT DOCUMENTS

| 2014/0344391 A1* | 11/2014 | Varney | H04L 41/50 709/213 |
| 2014/0344399 A1* | 11/2014 | Lipstone | H04L 41/509 709/217 |
| 2014/0344452 A1* | 11/2014 | Lipstone | H04L 65/612 709/224 |

* cited by examiner

*Primary Examiner* — Khoi V Le
(74) *Attorney, Agent, or Firm* — Michael A. Springs, Esq.; Shumaker, Loop & Kendrick, LLP; Patrick B. Horne

(57) ABSTRACT

Disclosed are systems d methods for optimizing resource utilization by generating resource initialization data that is customized to particular users. The initialization data is customized and optimized based on user evaluation data that includes information about user attributes, functions, and user computing devices. The systems and methods utilize artificial intelligence ("AI") systems to process data received from user devices, such as Internet navigation data, device configuration data, and user account data associated with users that have been authenticated. The AI systems process the user evaluation data to classify users by determining the probabilities that the users match predefined classifications. For users that meet predefined classifications, the AI systems determine probabilities that users will accept customized resource initialization parameters. The user acceptance probabilities are used to determine optimized resource initialization data and to generate graphical user interfaces that display optimized resource initialization data on a user computing device.

19 Claims, 9 Drawing Sheets

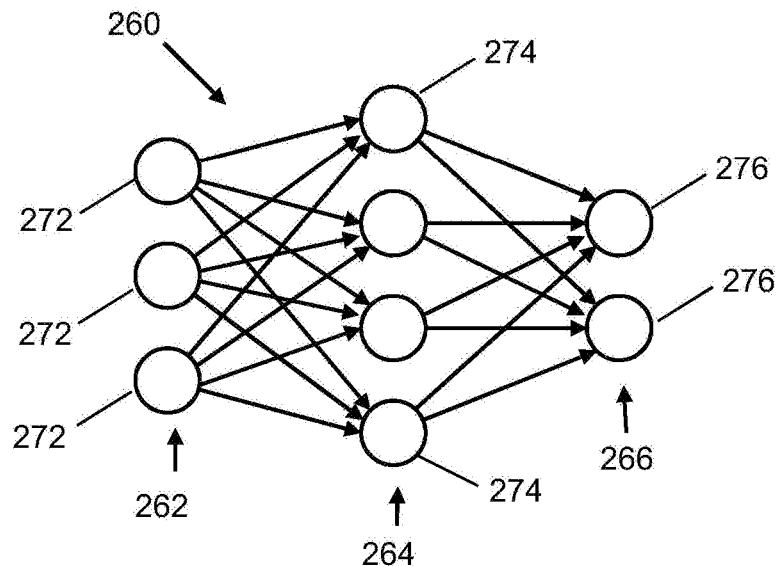
FIG. 2A
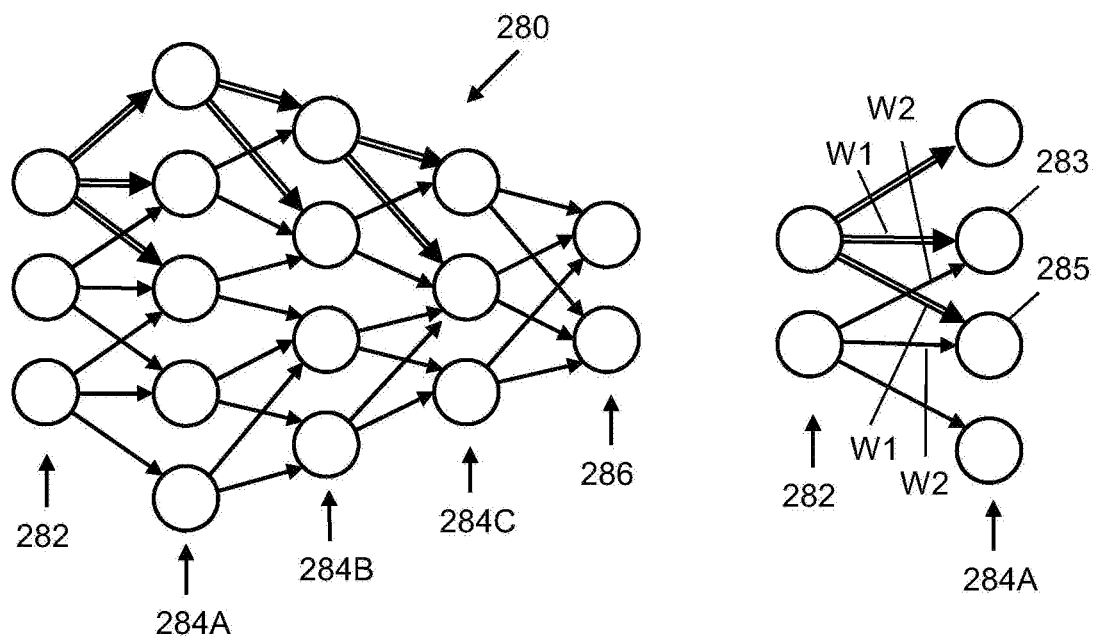
FIG. 2B     FIG. 2C

OPTIMIZING RESOURCE UTILIZATION

TECHNICAL FIELD AND BACKGROUND

The present invention relates generally to the field of generating and optimizing resource initialization data presented to system users, and more particularly, to systems and methods for capturing user attribute, user function, and electronic device data that is processed using machine learning technology to generate optimized resource initialization data that is customized and displayed to particular users.

Traditional campaigns to achieve new user account or customer initialization rely on standardized initialization parameters that are agnostic to user and user device attributes and functions. Without tailoring initialization data to specific users, an enterprise must present standardized initialization data to large numbers of users to achieve even small conversion rates of users that initialize an account. Of the users that initiate a new account, an even smaller portion users become long-term, beneficial users for an enterprise. The result is that campaigns can be costly, inefficient, and ineffective at account initialization.

To address the drawbacks of traditional campaigns, disclosed herein, are systems and methods that capture a variety of user and device attribute and function data that is used to generate resource initialization data tailored to particular users. The initialization data thereby achieves higher conversion rates of users that initialize a user account.

SUMMARY

According to one embodiment, a system for optimizing resource utilization includes at least one server computing device that includes one or more integrated software applications. The integrated software applications perform operations that include receiving the following from an user computing device: (i) a user interface transmit command to initiate the transmission of display data that can be utilized by the user computing device to generate a graphical user interface (i.e., a webpage or screen in a mobile software application), (ii) user device system configuration data (e.g.. IP address, operating system type, etc.), (iii) navigation data (e.g., websites visited), and (iv) user authentication data (e.g., a user name and password).

The user authentication data is passed to an identity management service that verifies the user authentication data by comparing the received user authentication data against known user authentication data stored to a database. The identity management service generates an authentication notification message that includes a verification flag indicating whether the received user authentication data was verified. If the user authentication data was verified, the authentication notification message is sent to the server computing device, and the server computing device retrieves or requests user account data from a database, such as a user account number, mailing address, and account balances.

The navigation data, user account data, and the system configuration data is passed to a user resource evaluation service. The user resource evaluation service performs a durational analysis and a quality analysis using the navigation data, the system configuration data, and the user account data. The result is user classification data that classifies the user according to certain pre-defined categories, such as defining the user as a long-term or short term account holder or classifying the user as a quality customer. The user resource evaluation service next performs a user rating analysis by processing the user classification data to generate a user rating score.

If the user rating score meets a minimum threshold, the user resource evaluation service performs an acceptance analysis to determine the probability that a user will initialize an account or provide resource. The acceptance analysis can be performed on a range of potential resource initialization parameters so that resource initialization data can be selected that has an optimized probability of being accepted by a user. Resource initialization data is selected and formatted for display on the user computing device.

In another embodiment, the user resource evaluation service includes rules engine software code that is used to analyze the user classification data generated by the durational analysis and the quality analysis. The generated user classification data is compared against classification threshold data. If the thresholds are not met, no resource initialization data is generated, and the acceptance analysis is not performed. To illustrate, the classification threshold data might indicate that only probable long-term account holders should receive resource initialization data. The user resource evaluation service rules engine software compares the classification threshold data against the user classification data generated by the durational analysis. If the user classification data generated by the durational analysis does not indicate the user is a probable long term user, then no resource initialization data is generated and the process can be terminated.

The user resource evaluation service is implemented by at least one neural network that is used to perform the durational analysis, the quality analysis, and the acceptance analysis. The neural network can be implemented as a convolutional neural network or a support vector machine. In some embodiments, the durational analysis, quality analysis, and acceptance analysis can be performed by separate neural networks of the same or different types.

The neural networks can be refined through a training process. The system captures decision data representing whether resource initialization data was accepted by a user. The system creates a historical resource initialization database record that includes the user account data, the navigation data, the system configuration data, and the resource initialization decision data. The historical resource initialization database record is processed using a labeling analysis to generate known labeling data that classifies the user according to certain pre-defined categories, such as defining the user as a long-term or a short term account holder. That is, in hindsight, a provider knows whether the user became a long-term or short-term account holder, and the user is labeled accordingly.

The historical resource initialization database record is processed by the neural network by performing the acceptance analysis to generate training decision data—i.e., a probability as to whether resource initialization data will be accepted. Then, the calculated probability is compared against the known decision data, and the neural network parameters are adjusted to minimize error. Similarly, the neural network processes the historical resource initialization database record using the durational and quality analyses to determine user classification data and probabilities that the user falls within certain predefined classifications. The calculated classification data is compared against the known labeling data, and the neural network parameters are adjusted to minimize observed error rates.

BRIEF DESCRIPTION OF THE DRAWINGS

Features, aspects, and advantages of the present invention are better understood when the following detailed description of the invention is read with reference to the accompanying figures described below.

FIG. 2A is a diagram of a feedforward network, according to at least one embodiment, utilized in machine learning.

FIG. 2B is a diagram of a convolution neural network, according to at least one embodiment, utilized in machine learning.

FIG. 2C is a diagram of a portion of the convolution neural network of FIG. 2B, according to at least one embodiment, illustrating assigned weights at connections or neurons.

DETAILED DESCRIPTION

Figure 1:
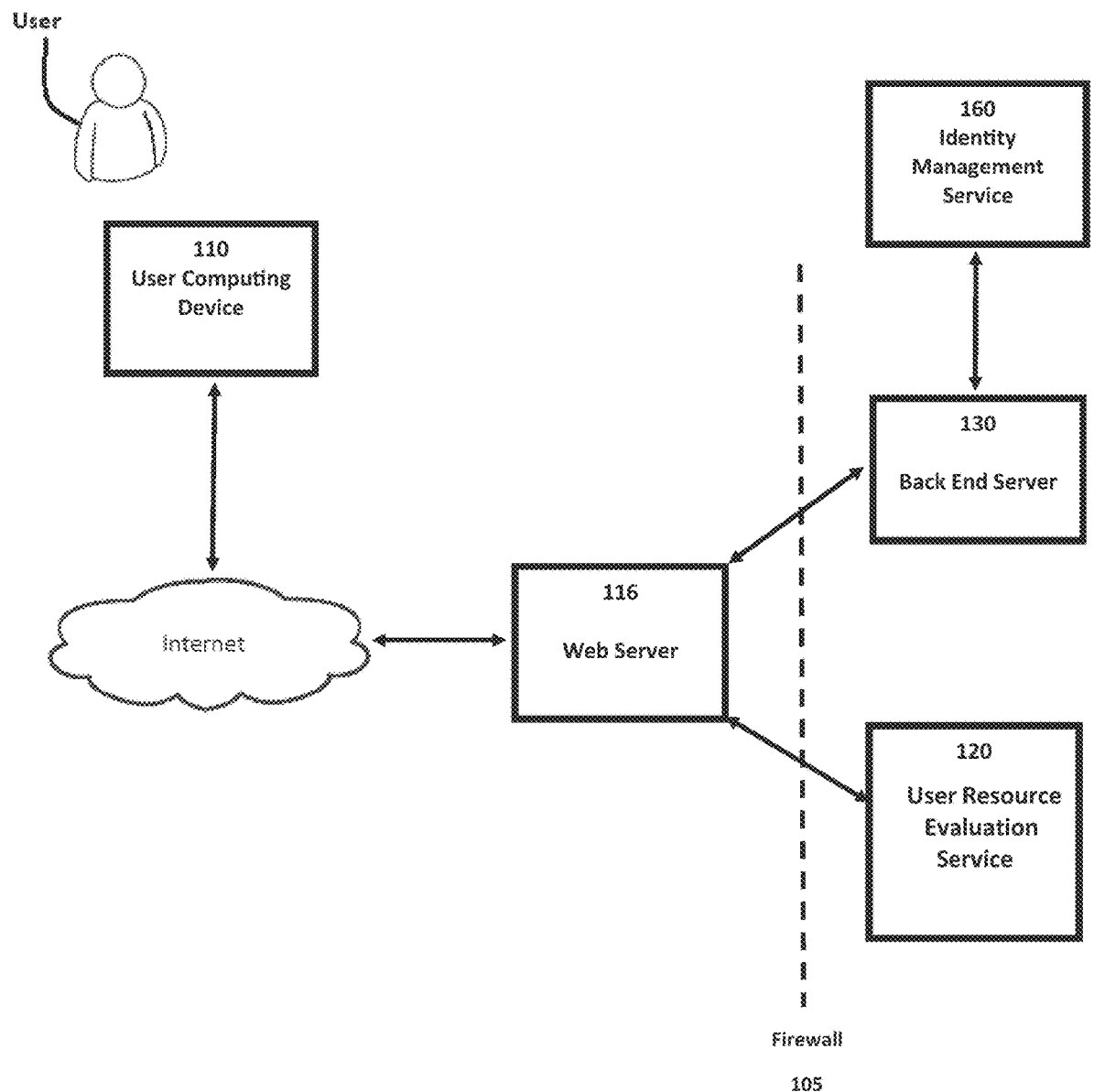
FIG. 1 is an example system diagram according to one embodiment.

The present invention will now be described more fully hereinafter with reference to the accompanying drawings in which example embodiments of the invention are shown. However, the invention may be embodied in many different forms and should riot be construed as limited to the representative embodiments set forth herein. The exemplary embodiments are provided so that this disclosure will be both thorough and complete and will fully convey the scope of the invention and enable one of ordinary skill in the art to make, use, and practice the invention. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

It will be understood that relative terms are intended to encompass different orientations or sequences in addition to the orientations and sequences depicted in the drawings and described herein. Relative terminology, such as "substantially" or "about," describe the specified devices, materials, transmissions, steps, parameters, or ranges as well as those that do not materially affect the basic and novel characteristics of the claimed inventions as whole (as would be appreciated by one of ordinary skill in the art).

The terms "coupled," "fixed," "attached to," "communicatively coupled to," "operatively coupled to," and the like refer to both: (i) direct connecting, coupling, fixing, attaching, communicatively coupling; and (ii) indirect connecting coupling, fixing, attaching, communicatively coupling via one or more intermediate components or features, unless otherwise specified herein, "Communicatively coupled to" and "operatively coupled to" can refer to physically and/or electrically related components.

As used herein, the term provider generally describes the person or business entity providing account services. The term provider is used interchangeably with the terms enterprise or financial institution. The term account generally denotes a business arrangement providing for regular dealings between the provider and customer. The term user generally describes an individual or entity that utilizes an account or purchases products and services from a provider. The term user may be used interchangeably with the terms customer, consumer, or client.

Embodiments are described with reference to flowchart illustrations or block diagrams of methods or apparatuses where each block or combinations of blocks can be implemented by computer-readable instructions (i.e., software). The term apparatus includes systems and computer program products. The referenced computer-readable software instructions may be provided to a processor of a general purpose computer, special purpose computer, or other programmable data processing apparatus to produce a particular machine. The instructions, which execute via the processor of the computer or other programmable data processing apparatus, create mechanisms for implementing the functions specified in this specification and attached figures.

The computer-readable instructions are loaded onto a computer or other programmable data processing apparatus to cause a series of operational steps to be performed on the computer or other programmable apparatus to produce a computer-implemented process such that the instructions, which execute on the computer or other programmable apparatus, provide steps for implementing the functions specified in the attached flowchart(s) or block diagram(s). Alternatively, computer software implemented steps or acts may be combined with operator or human implemented steps or acts in order to carry out an embodiment of the disclosed systems and methods.

The computer-readable software instructions may also be stored in a computer-readable memory that can direct a computer or other programmable data processing apparatus to function in a particular manner. In this manner, the instructions stored in the computer-readable memory produce an article of manufacture that includes the instructions, which implement the functions described and illustrated herein.

System Level Description

Disclosed are systems and methods for implementing and optimizing account initialization data that is customized to particular users based on user attributes, behavior, functions, and device data. The systems and methods are described with reference to example embodiments for campaigns implemented by a service provider to acquire new customers or incentivize existing customers to establish new accounts and products. Those of skill in the art will appreciate, however, that the example embodiments are not intended to be limiting, and the described systems and methods could also be applied to implement and optimize electronic campaigns in other industries or contexts. For instance, the systems and methods could be used to present users with customized offers to incentivize users to apply for a job with a given enterprise, purchase a product, or enroll in a periodic service offered by the enterprise.

As shown in FIG. 1, a hardware system configuration according to one embodiment generally includes a user computing device 110 (e.g., an Internet-enabled device) operated by a consumer and a computer system associated with a provider. The provider's computer system may include one or more computing devices, such as a web server 116, a campaign manager 120, a back end server 130, and one or more personal computing devices operated by the provider employees. The provider system can also include additional components, such as a firewall 105 or identity management services 160 that stores information concerning the identities and authentication credentials of provider employees and users.

The embodiment shown in FIG. 1 is not intended to be limiting, and one of ordinary skill in the art will appreciate that the system and methods of the present invention may be implemented using other suitable hardware or software configurations. For example, the system may utilize only a single server implemented by one or more physical or virtual computing devices, or a single computing device may implement one or more of the web server 116, campaign manager 120, back end server 130, provider employee computing devices, firewall 105, or identity management service 160. Further, a single computing device may implement more than one step of the method described herein, or a single step may be implemented by more than one computing device.

The user computing device 110, web server 116, campaign manager 120, back end server 130, and provider employee computing devices 140, include components such as: (i) a central processor unit; (ii) one or more memory devices coupled to the processor, such, as random access memory or read-only memory; and (iii) a storage device operatively coupled to the processor, including at least one of a non-transitory storage medium that stores computer-readable instructions for execution by the processor. Various types of storage device may be used, including an optical, a magnetic, or solid-state storage devices.

The computer-readable instructions can include instructions for implementing an operating system and various software applications or programs. The storage device can store various other data items, which can include, as non-limiting examples, cached data, user files, such as those for pictures, audio and/or video recordings, files downloaded or received from other devices, and other data items preferred by the user or required or related to any or all of the applications or programs.

By processing instructions stored on one or more storage devices, the processors may perform the steps of the present methods and implement the present systems. The user computing device 110, the web server 116, campaign manager 120, or back end server 130 include one or more integrated software applications that provide a graphical user interface ("GUI"), permit communication with other electronic devices, and generally carry out the steps of the present systems and methods.

The computing devices may also utilize software applications that function using resource available through a third-party provider, such as a Software as a Service ("SaasS"), Platform as a Service ("PaaS"), or Infrastructure as a Service ("IaaS") provider running on a third-party cloud service computing device. For instance, a cloud computing device may function as a resource provider by providing remote data storage capabilities or running software applications utilized by remote devices.

The consumer computing device 110 can be a portable electronic device that includes an integrated software application configured to operate as a user interface and to provide two-way communication with the provider's computer system. The portable electronic device can be any suitable type of electronic device, including, but not limited to, a cellular smartphone or a tablet computer. As another example, the user computing device can be a larger device, such as a laptop or desktop computer. Typically, the user computing device 110 accesses the provider's computer system over the Internet in the normal manner—e.g., through one or more remote connections, such as a Wide Area Network ("WAN"), Wireless Wide Area Network based on 802.11 standards, or a data connection provided through a cellular service provider.

Exemplary GUI display screens are depicted in the attached figures. The GUI display screens may include features for displaying information and accepting inputs from users, such as text boxes, data fields, hyperlinks, pull down menus, check boxes, radio buttons, and the like. One of ordinary skill in the art will appreciate that the exemplary functions and user-interface display screens shown in the attached figures are not intended to be limiting, and an integrated software application may include other display screens and functions.

Capturing User Evaluation Data

Providers implement an electronic campaign by generating resource initialization parameter data associated with a product identifier and stored to a database on the provider system. A product identifier specifies a particular product, service, or account that is to be offered as part of an electronic campaign. Non-limiting examples include offering users an opportunity to establish a checking account with no minimum balance required, a home loan, or personal loan. In each case, the checking account or loan is associated with a particular product identifier. The electronic campaign presents initialization parameters to users that offer provider resources (e.g., monetary amounts) as an incentive for customers to initialize a transaction or account with the provider, such as purchasing a produce or initializing a new checking account.

The resource initialization parameter data and resource initialization data includes a range of potential provider resources that are presented to users as part of a campaign, including initialization type data and initialization value data. For instance, the resource initialization parameter data could include a discrete set of monetary amounts offered to users (e.g., $100, $200, $500), discrete ranges of interest rates offered for a loan (e.g., 4-5%), or a number of months for which no payment is required on a credit card or loan (e.g. 2 months interest free). In that case, the initialization type data identifies the type of resources offered by the provider (e.g., monetary sum, interest rate, months with no payment owed), and the initialization value data indicates the numeric value of the offer (e.g., $500 sum, 3% interest, 2 months, etc.).

The product identifier and resource initialization parameter data can be varied depending on user evaluation data, as explained in detail below. The resource initialization parameter data includes thresholds or other values established by, a provider as part of electronic campaign design, such as parameters that direct initialization data and provider resources to be presented to certain users but not others.

User evaluation data includes a wide variety of information that is used by the provider system to evaluate the probability a user will accept an offer and become a quality customer or account holder for the provider. User evaluation data includes, without limitation: (i) navigation data; (ii) system configuration data; and (ii) user account data.

User evaluation data is captured when a user computing device is used to access the provider system to request data to be displayed on the user computing device. User computing devices access the provider system using an Internet browser software application to access the web server to display a provider webpage. Alternatively, user computing devices access the provider system through a provider mobile software application that displays GUI screens.

In accessing the provider system, the user computing device transmits a user interface transmit command to the web server that can include: (i) an Internet Protocol ("IP") address for the user computing device; (ii) navigation data; and (iii) system configuration data. In response to the user interface transmit command, the web server returns provider display data and a digital cookie that is stored to the user computing device and used to track functions and activities performed by the user computing device.

In some embodiments, the navigation data and system configuration data are utilized by the web server to generate the provider display data. For instance, the system configuration data may indicate that the user computing device is utilizing a particular Internet browser or mobile software application to communicate with the provider system. The web server then generates provider display data that includes instructions compatible with, and readable by, the particular Internet browser or mobile software application. As another example, if the navigation data indicate the user computing device previously visited a provider webpage, the provider display data can include instructions for displaying a customized message on the user computing device, such as "Welcome back Patrick!"

After receiving provider display data, the user computing device processes the display data and renders GUI screens presented to users, such as a provider website or a GUI within a provider mobile software application. The web server also transmits the navigation data and system configuration data to the campaign manager for processing as user evaluation data. Note that in some embodiments, the navigation data and system configuration data may be sent to the provider system in a separate message subsequent to the user interface transmit command message.

The provider display data can include one or more of the following: (i) webpage data used by the user computing device to render a webpage in an Internet browser software application; (ii) mobile app display data used by the user computing device to render GUI screens within a mobile software application; (iii) resource initialization display data that is used by the user computing device to render a webpage or banner that provides users access to view, select, and accept an offer made as part of an electronic campaign. Categories of webpage or mobile app display data can include graphical elements, digital images, text, numbers, colors, fonts, or layout data representing the orientation and arrangement graphical elements and alphanumeric data on a user interface screen.

Navigation data transmitted by the user computing device generally includes information relating to prior functions and activities performed by the user computing device. Examples of navigation data include: (i) navigation history data (i.e., identifiers like website names and IP addresses showing websites previously access by the user computing device); (ii) redirect data (i.e., data indicating whether the user computing device selected a third-party universal resource, locator ("URL") link that redirected to the provider web server); and (iii) search history data (e.g., data showing keyword searches in a search engine, like Google® or Bing®, performed by the user computing device).

Navigation history data allows a provider to determine whether a user computing device was previously used to visit particular websites, including the provider's own website. The navigation history data further indicates whether the user computing device accesses relevant third-party websites, such as provider websites that offer products and services similar to those offered by a provider. The navigation history data includes, without limitation: (i) URL data identifying a hyperlink link to the website; (ii) website identification data, such as a title of a visited website; (iii) website IP address data indicating an IP address for a web server associated with a visited website; and (iv) time stamp data indicating the date and time when a website was accessed.

Redirect data may indicate whether the user computing device selected a third-party link that redirected the user computing device to the web server. For instance, a user might select a hyperlink displayed within an Internet browser in response to a search engine query or select a hyperlink displayed on a social media feed. Selecting the third-party hyperlink causes the user computing device to transmit a user interface transmit command to the webserver. The redirect data includes information that identifies the source of the third-party link, such as identifying a particular social platform or website where an electronic offer was displayed, or that identifies a particular advertisement if a provider has published multiple advertisements to the same website or social media platform.

Search history data is generated when a user computing device runs a query within a search engine. The search history data can include, without limitation: (i) a search engine identifier indicating the search engine that was utilized; (ii) search parameter data indicating the alphanumeric strings or operators used as part of a search query (e.g., Boolean operators such as "AND" or "OR" or functional operators, like "insite" used to search the contents of a specific website); and (iii) time stamp data indicating the date and time a search was performed.

The user computing device may also transmit system configuration data to the provider system that is used to evaluate a user or authenticate the user computing device. System configuration data can include, without limitation: (i) a unique identifier for the user computing device (e.g., a media access control ("MAC") address hardcoded into a communication subsystem of the user agent computing device); (ii) a MAC address for the local network of a user computing device (e.g., a router MAC address); (iii) copies of key system files that are unlikely to change between instances when a user accesses the provider system; (iv) a list of applications running or installed on the user computing device; and (v) any other data useful for evaluating users and authenticating a user or user computing device.

The user computing device optionally authenticates to the provider system if, for instance, the user has an existing electronic account with the provider. The user computing device navigates to a login interface and enters user authentication data, such as a user name and password. The user then selects a submit function on an user interface display screen to transmit an user authentication request message that includes the user authentication data to the provider web server. In some embodiments, the user authentication data and user authentication request message can further include elements of the system configuration data that are used to authenticate the user, such as a user computing device identifier or internet protocol address.

The web server passes user authentication request message to the identity management service, which performs a verification analysis to verify the identity of the user or the user computing device. The verification analysis can compare the received user authentication data to stored user authentication data to determine whether the authentication data sets match. In this manner, the identity management service determines whether a correct user name, password, device identifier, or other authentication data is received. The identity management service returns an authentication notification message to the web server. The authentication notification message includes a verification flag indicating whether the verification passed or failed and a reason for any failed authentication, such as an unrecognized user name, password, or user computing device identifier.

The user authentication request message can also include system configuration data, and the back end server can use system configuration data and user account data to perform the authentication process. As one example, the identity management service might store a user computing device MAC address to a database record as part of the user account data. Upon receipt of an user authentication request message that includes a MAC address, the identity management service compares the received MAC address against stored MAC address data associated with the user account data. In this manner, the user computing device can also be authenticated to the provider system, if the received and stored MAC addresses do not match, the identity management service returns an authentication decision message to the web server indicating the authentication failed because the user computing device could not be authenticated. The web server can then prompt the user to verifying whether the consumer is using a new device to login to the provider system, and if so, being the process of registering a new device to the provider's system.

The system may also utilize multifactor authentication techniques ("MFA") to authenticate the user identity or a user computing device. As one example, if the user authentication data is successfully verified, a MFA software process running on the provider system can initiate a telephone call to a phone number stored as part of the use account data. Upon receiving the call, the user selects an input function on the telephone to transmit response data to the MFA software process that confirms receipt of the call, thereby further authenticating the user's identity. The function can be the user's selection of any key on the telephone or a predetermined sequence of keys, such as a passcode. Those of skill in the art will appreciate that other forms of MFA are possible, such as sending a text message containing a passcode to the user's cellular phone that must be entered into a user interface screen.

Following successful user authentication, the identity management service transmits a verification notification message to the campaign manager that includes an unique user identifier (e.g., a user name or customer number) and a verification flag that indicates whether the user was successfully authenticated and/or logged into the provider system. The campaign manager can respond by sending an user data request message to the back end server. The back end server responds to the user data request message by transmitting a user account data packet to the campaign manner that includes user account data for storage and processing as user evaluation data.

The user account data can include a variety of information, such as: (i) the unique user identifier; (ii) user residential data indicating a geographic region where the user resides (e.g., a zip code, city, state); (iii) one or more product identifiers that indicate the accounts or products currently held by a user; (iv) user duration data, such as a date when a user first established an account with the provider or a total duration of time the user has held an account with a provider; (v) average product balance data that indicates the average value of products held by the user over a given time period (e.g., an average monthly balance for a checking account held by the user or an outstanding principal balance owed on a loan); (vi) current product balance data that indicates the current value of products held by the user (e.g., the current balance of any checking or brokerage account); (vii) average product transaction volume data indicating the average number of transactions a user conducts using a given product over a given time period (e.g., the number of deposits or withdraws per month for a checking account); and (viii) referral data indicating whether, and how many, customers that a user has referred to the provider.

Processing User Evaluation Data

A user resource evaluation service software module runs on the campaign manager shown in FIG. 1 to processes the user evaluation data to make recommendations concerning resource initialization data to transmit to user computing devices. The user resource evaluation service software module can be implemented as a rules-based software process or as software that performs statistical analyses using machine learning techniques to automatically analyze the user evaluation data.

As explained in more detail below, the machine learning techniques can include trained neural networks that accept user evaluation data, resource initialization parameter data, and resource initialization data as inputs and that outputs recommended offers, based on patterns in the user evaluation data. The output of the user resource evaluation service software module can include a recommendation that includes resource initialization data, such as offering a particular monetary sum as an incentive to a user to open a new savings account or offering a particular interest rate as an incentive for a user to submit a loan application.

The user resource evaluation service analysis output can additionally include information that quantifies the recommendation, such a probability that an offer of resource initialization data will be accepted or a probability that a user who accepts the resource initialization data will become a long-term account holder with the provider. The outputs for the user resource evaluation service can further include user classification data that identifies particular attributes of the user or label categorizes to be applied to or associated with the users. For example, the user classification data can take the form of a code or alphanumeric label that identifies the user as a long term or short term account holder or as a high- or low-quality user, as explained in more detail below.

In a first process, users are categorized using neural networking techniques according to the likelihood that the user will fall into predetermined durational or quality categories selected by a provider, such as becoming a long-term, quality customer for the provider. The user resource evaluation service can also evaluate a user rating that the provider system utilizes to compare users and to determine whether the user is eligible to receive an electronic offer. That is, provider system settings can include certain thresholds for user ratings and classifications such that resource initialization data is sent only to those users that meet the predetermined thresholds.

The user resource evaluation service runs a durational analysis to generate user classification data that categorizes users according to an expected duration that the user will hold an account with the provider. As an example, the durational analysis can be conducted by a support vector machine using logistic regression to determine a probability of whether or not a user will be a long-term user for the provider. The provider can define long-term users according to customizable preferences, such as defining a long-term user a holding an account for longer than one year.

The provider system durational analysis can also characterize users according to additional categories, such as the probability a user will be a "short-term" account holder (e.g, less than six months or another pre-defined threshold) or an "intermediate-term" account holder (e.g., between six months and one-year). After the durational analysis calculates the probabilities a user will be long-, intermediate-, or short-term, the recommendation analysis can categorize the user according to the category having the highest probability.

The provider system user resource evaluation service can also run a quality analysis to generate user classification data that categorizes users according to quality metrics defined by a provider. Example categories can include categorizing users as "high quality" where a user is likely to hold an average account balance above a certain threshold (e.g., above $50,000) or likely to make timely payments on a loan or credit card. The provider can optionally utilize additional categories, such as "low quality" users (e.g., users likely to have an average account balance of less than $1,000) or "medium quality" users (e.g., users likely to have an average account balance between $1,000 and $50,000).

The provider system user resource evaluation service runs an acceptance analysis to determine the probability a user will accept resource initialization data transmitted to the user computing device. In one embodiment, the acceptance analysis is conducted by a support-vector machine utilizing logistic regression to make a binary prediction about whether resource initialization data will be accepted or not. The acceptance analysis can also utilizes other regression models to determine the probability an offer will be accepted, and a rules-engine is used to determine that the campaign manager should extend the offer if the probability of acceptance is above a specified threshold. Such thresholds are stored to a database as campaign parameter data.

The users are categorized through neural networking techniques with neural networks that have been trained with previously categorized historical user evaluation data. After an electronic offer is extended to a user, a historical resource initialization database record is created and stored to the provider system or a third party storage facility. The historical resource initialization database record can include the user decision as to whether or not an offer is accepted (e.g., decision data) along with user evaluation data, resource initialization data (e.g., a product identifier for the offer, offer type data, and offer value data), resource initialization parameter data for that particular user and offer, and the results of the durational analysis, quality analysis, acceptance analysis, and/or user rating analysis.

After a predetermined amount of time elapses, the system retrieves the historical database record to perform a labeling analysis. The labeling analysis determines the duration of time the user has, or was, an account holder and determines specified quality metrics, such as average account balances, timely payments, profitability, or other useful metrics. The duration calculation and quality metric calculations are utilized to generate known labeling data that categorize the user as long, short, or intermediate term, and/or as a low, medium, or high quality user—or other category labels specified by the provider.

The historical labeling data is stored to the historical resource initialization database record to create a training data set. The training data set is input to neural network software applications and machines that perform the various analyses, such as the durational, quality, acceptance, and/or user rating analyses. The outputs of the neural network software applications are evaluated to determine whether the outputs match the historical labeling data within pre-defined error rates. The weighting coefficients of the neural network software applications are adjusted to reduce the error rates, and the process is run iteratively to train the neural network. The training can be done, for example, on a non-production network or server that is not processing current user data. Once the neural network software applications are trained in a non-production environment, the software applications are uploaded to a production environment campaign manager to process user data in real-time.

The various categories of user evaluation data are used as inputs to a neural network where the individual nodes represent probability functions and the connections between nodes represent weights assigned to each node input/output. The system may use multiple trained neural networks with separate neural networks conducting the offer acceptance, durational, and quality analyses.

To illustrate neural network training, the provider may know from historical data that a given user held an account for much longer than one-year and is, therefore, a long-term user. The given user's user evaluation data is fed into the neural network to determine the probability the user is categorized as a long-term user within a pre-defined error rate. If the probability calculations show that the neural network categorized the user as short-term, the neural network parameters are adjusted until the user is correctly categorized as long-term within an acceptable error rate. The neural network is thus refined or trained using the historical data.

The use of neural networking techniques is illustrated with the following simplified examples. A provider system might run a durational analysis on navigation history data that shows a given user has, on two prior occasions, visited the provider webpage describing a checking account product. In that case, the durational analysis might determine the user has a seventy-five percent (75%) chance of becoming a long-term account holder. The acceptance analysis is then performed with the user evaluation data on different resource initialization parameters, such as various values of resource initialization data. The acceptance analysis may determine that there is a twenty percent (20%) probability the user will accept initialization value data in the amount of $200 to open a checking account and that increasing the offer amount does not appreciably increase the probability of acceptance. In this manner, a provider can optimize the resource initialization value data so that provider resources are not wasted by extending offer amounts that are too high.

Continuing with the foregoing example, if the user resource evaluation service determines that the 20% acceptance probability is above a predefined acceptance threshold specified as part of the campaign parameter data, the campaign manager is instructed to transmit initialization value data of $200 within the resource initialization data. Alternatively, the user evaluation service generates a recommendation that the user be extended an initialization value data of $200, and the recommendation is displayed to a provider employee for approval. Otherwise, the electronic resource initialization data is not transmitted to the user computing device.

As a further example, the user resource evaluation service might use neural networking techniques to determine that users in a given geographic area who select a $200 offer on a particular social media advertisement have a ten percent (10%) probability of accepting the resource initialization data and becoming a long-term provider account holder, and such probabilities increase to twenty percent (20%) when the amount is increased to $300. The campaign parameter data might specify, however, that the acceptance threshold is only five percent (5%) and that $200 is the maximum permissible offer to be included in the resource initialization data. In that case, the user resource evaluation service processes the campaign parameter data to determine that $200 should be offered and transmitted to the user as part of resource initialization data. The user geographic location data and be determined from the user account data (i.e., an address on file). Alternatively, user geographic location data can be determined from system configuration data where a user computing device IP address is passed to a third-party service or database that returns an approximate location.

The user resource evaluation service could also utilize the system configuration data, such data showing a user computing device has certain software configurations (e.g., an iPhone® or a smartphone using an Android® operating system). The acceptance analysis might show that users have higher probabilities of accepting the resource initialization data and becoming quality users if, for instance, the user computing device is better compatible with a provider's technology leading to better user experiences.

Further, these factors might carry different weights in the analyses. That is, for a given product and a given offer, users from a particular geographic area might have much higher probabilities of becoming a long-term provider customer than users from other geographic areas. In that case, when the user evaluation service recognizes the user is from that particular geographic area, the factor relating to the geographic area of the user might then carry a higher weight in, the input to the probability function of the durational analysis. Continuing with the above example, the provider system might recognize based on training data that increasing the initialization value data from $100 to $300 doubled the acceptance rate for users in the particular geographic area. In that case, initialization value data of $300 will carry a higher weight in the acceptance analysis, and the provider can utilize this data as actionable insights to increase the offer amount.

The neural networks are trained through user evaluation data that has been previously analyzed to determine various categories of users and the likelihood that an offer will be accepted. That is, previously categorized user evaluation data is, input into a neural network, and the offer acceptance, durational, and quality probabilities are calculated and compared against the previously calculated known values to determine an error rate. The weights of the neural network node connections can then be adjusted and the probabilities recalculated to reduce the error rate. The process is repeated iteratively until the error rate is minimized to a satisfactory threshold.

Those of skill in the art will appreciate that the above examples are not intended to be limiting, and other types of artificial intelligence and/or machine learning programs can be incorporated within the existing system architecture or configured as a standalone modular component, controller, or the like communicatively coupled to the system. A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor ("KNN"), and the like. Additionally or alternatively, the machine learning algorithm may include one or more regression algorithms configured to output a numerical value in response to a given input. Further, the machine learning may include one or more pattern recognition algorithms—e.g., a module, subroutine or the like capable of translating text or string characters and/or a speech recognition module or subroutine. The machine learning modules may include a machine learning acceleration logic (e.g., a fixed function matrix multiplication logic) that implements the stored processes or optimizes the machine learning logic training and interface.

The machine learning modules utilized by the present systems and methods can be implemented with neural networking techniques. Neural networks learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, such as an acyclic graph with nodes arranged in layers.

A feedforward network 260 (as depicted in FIG. 2A) may include a topography with a hidden layer 264 between an input layer 262 and an output layer 266. The input layer 262 includes input nodes 272 that communicate input data, variables, matrices, or the like to the hidden layer 264 that is implemented with hidden layer nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge.

In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based, on the edges separating each of the layers. That is, the hidden layer 264 implements activation functions between the input data communicated from the input layer 262 and the output data communicated to the nodes 276 of the output layer 266.

It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem, Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient (e.g, a propagated value). The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An additional or alternative type of neural network suitable for use in the machine learning program and, or module is a Convolutional Neural Network ("CNN"). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program.

A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

An example convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons, FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Figure 3:
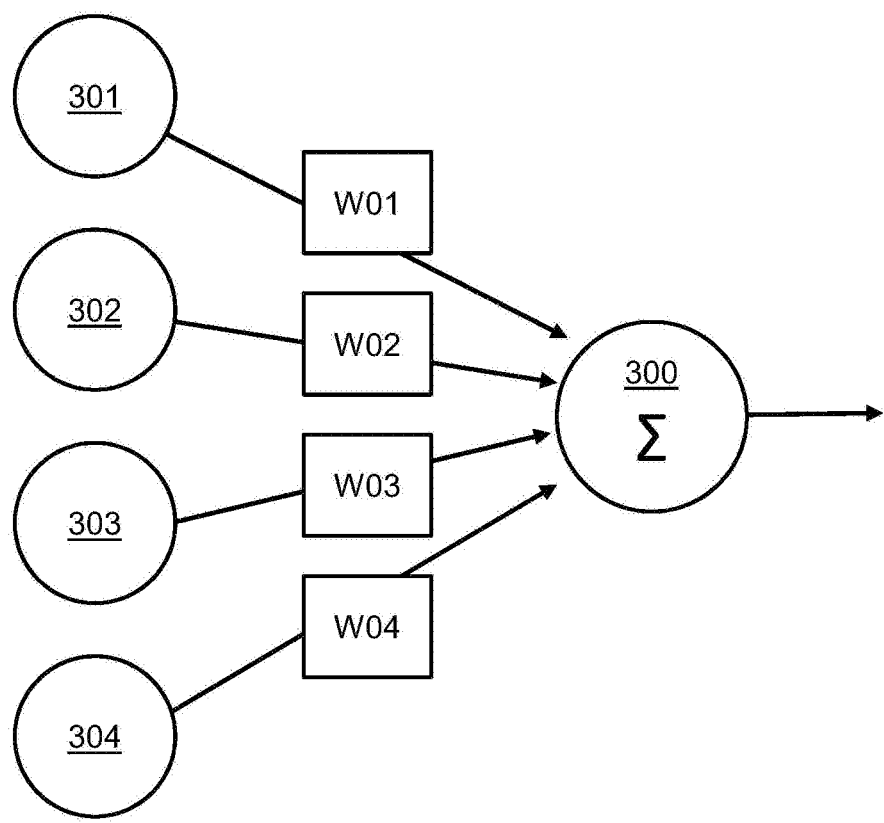
FIG. 3 is a diagram representing an example weighted sum computation in a node in an artificial neural network.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network ("RNN"). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter. That is, at least a portion of the output data from the RNN may be used as feedback or input in calculating subsequent output data. In some embodiments, the machine learning module may include an RNN configured for language processing (e.g., an RNN configured to perform statistical language modeling to predict the next word in a string based on the previous words). The RNN(s) of the machine learning program may include a feedback system suitable to provide the connection(s) between subsequent and previous layers of the network.

Figure 4:
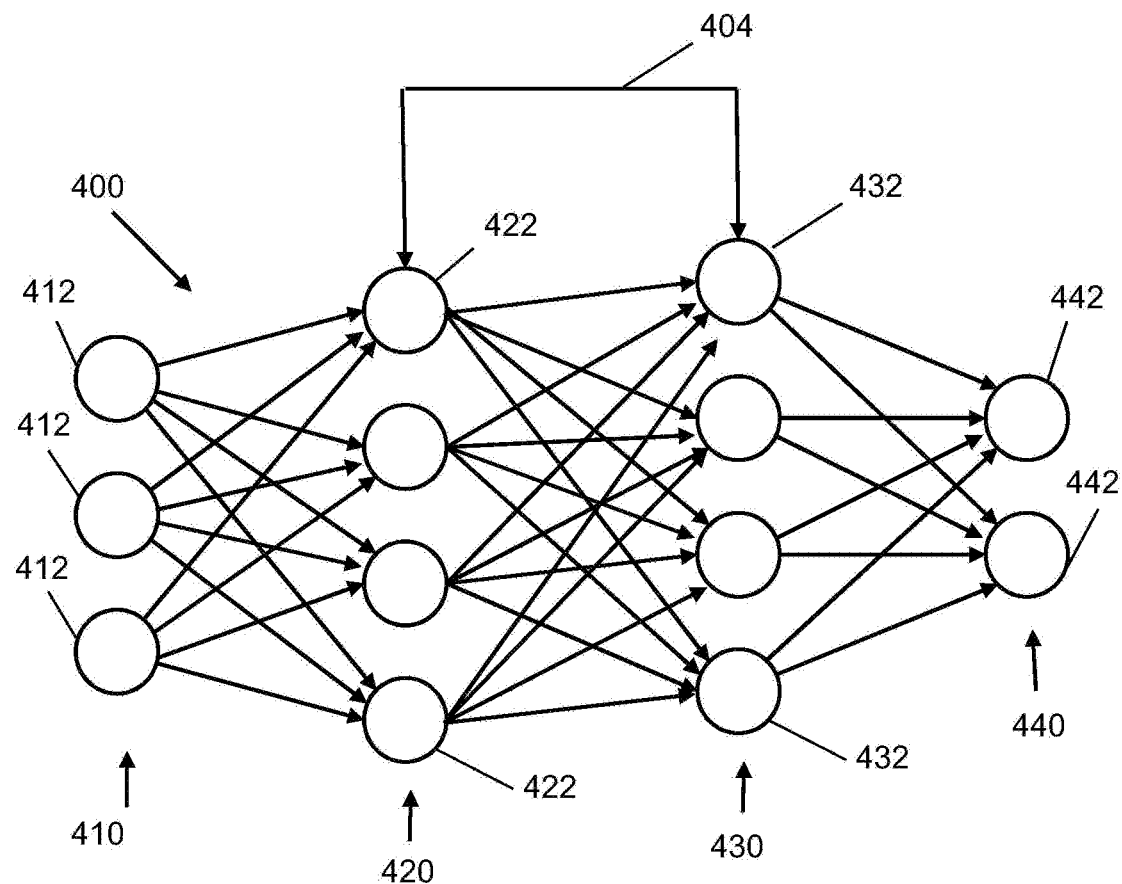
FIG. 4 is a diagram of a Recurrent Neural Network RNN, according to at least one embodiment, utilized in machine learning.

An example RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more nodes of a subsequent layer may provide or communicate a parameter or other data to a previous layer of the RNN network 400. Moreover, in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them (i.e., nodes of nonsequential layers of the RNN 400).

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks (e.g., by providing a known input vector, including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the, input data, and a second layer of the, neural network may be configured to perform statistical programs on the data communicated from the first layer. In various embodiments, each node of the previous layer of the network may be connected to an associated node of the subsequent layer (dense layers).

Generally, the neural network(s) of the machine learning program may include a relatively large number of layers (e.g., three or more layers) and are referred to as deep neural networks. For example, the node of each hidden layer of a neural network may be associated with an activation function utilized by the machine learning program to generate an output received by a corresponding node in the subsequent layer. The last hidden layer of the neural network communicates a data set the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

Figure 5:
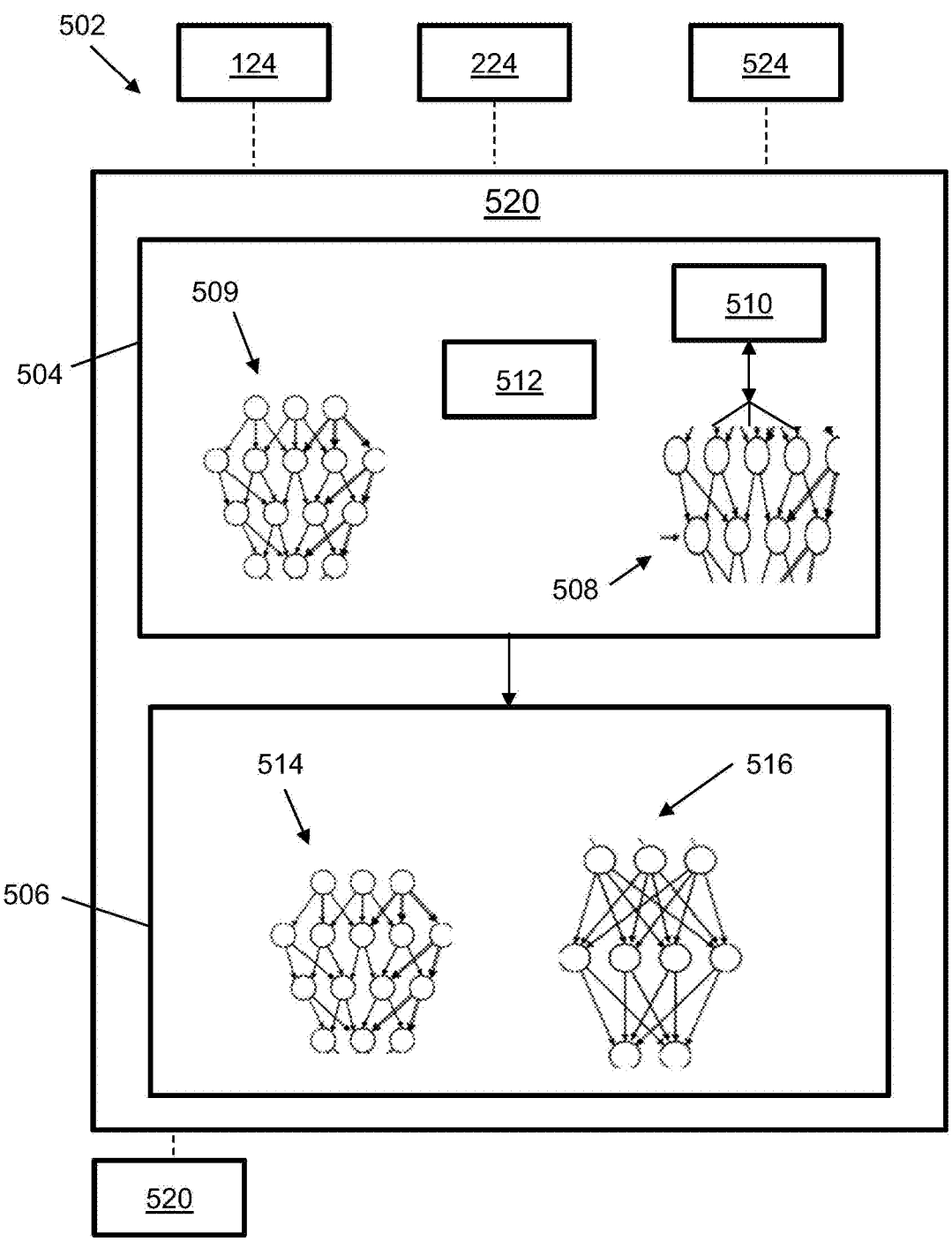
FIG. 5 is a schematic logic diagram of an artificial intelligence program including a front-end and a back-end algorithm.

Referring now to FIG. 5 and some embodiments, an artificial intelligence program 502 may include a front-end algorithm 504 and a back-end algorithm 506. The artificial intelligence program 502 may be implemented on an AI processor 520. The instructions associated with the front-end algorithm 504 and the back-end algorithm 506 may be stored in an associated memory device and/or storage device of the system (e.g., memory device 124 and/or memory device 224) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation). For example, a CNN 508 and/or AI algorithm 510 may be used for image recognition, input classification, and/or support vector training.

In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech, recognition, translation, and the like. For instance, the back-end network 506 may include one or more CNNs 514 or dense networks 516.

For instance and in some embodiments of the AI program 502, the program may be configured to perform unsupervised learning, in which the machine learning program performs the training process using unlabeled data (e.g., without known output data with which to compare). During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known (e.g, a mix of labeled and unlabeled data having the same distribution).

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives' suitable to perform the operations necessary for the system, and the present disclosure is equally applicable to such suitably configured machine learning and/or artificial intelligence programs, modules, etc. For instance, the machine learning program may include one or more long short-term memory ("LSTM") RNNs, convolutional deep belief networks, deep belief networks DBNs, and the like, DBNs, for instance, may be utilized to pre-train the weighted characteristics and/or parameters using an unsupervised learning process. Further, the machine learning module may include one or more other machine learning tools (e.g., Logistic Regression ("LR"), Naive-Bayes, Random Forest ("RF"), matrix factorization, and support vector machines) in addition to, or as an alternative to, one or more neural networks, as described herein.

Those of skill in the art will also appreciate that other types of neural networks may be used to implement the systems and methods disclosed herein, including, without limitation, radial basis networks, deep feed forward networks, gated recurrent unit networks, auto encoder networks, variational auto encoder networks, Markov chain networks, Hopefield Networks, Boltzman machine networks, deep belief networks, deep convolutional networks, deconvolutional networks, deep convolutional inverse graphics networks, generative adversarial networks, liquid state machines, extreme learning machines, echo state networks, deep residual networks, Kohonen networks, and neural turning machine networks, as well as other types of neural networks known to those of skill in the art.

Figure 6:
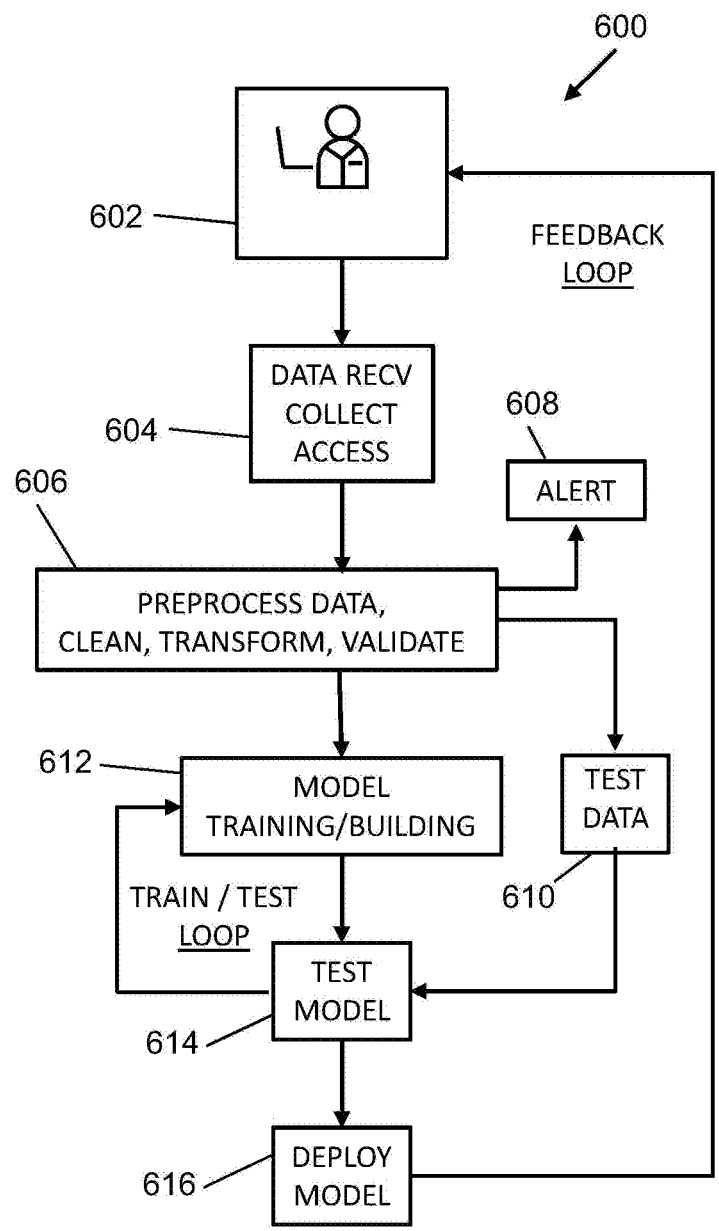
FIG. 6 is a flow chart representing a method, according to at least one embodiment, of model development and deployment by machine learning.

FIG. 6 is a flow chart representing a method 600, according to at least one embodiment, of model development and deployment by machine learning. The method 600 represents at least one example of a machine learning workflow in which steps are implemented in a machine learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, user evaluation data is received, collected, accessed, or otherwise acquired and entered as can be termed data ingestion. In step 606 the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated.

Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

User Rating and Generating User Offers

The campaign manager can be configured to perform a user rating analysis using the outputs of the acceptance, durational, and/or quality analyses. The user rating analysis determines a normalized or standardized user rating score that can be used by the provider to generate resource initialization data. The user rating score analysis can be customizable by a provider with various factors carrying differing weights depending on provider objectives.

For instance, the classification of a user as a high-quality user can be assigned a score of 5 where a medium-quality user is assigned a score of 3 and a low-quality user is assigned a score of 1. Similarly, long, intermediate, or short-term users can also be assigned scores of 5, 3, and 1 respectively. The scores for each user are totaled to ascertain a user rating score. The scores for long-term users or high quality users can be adjusted upwards if the provider determines that securing long-term or high quality account holders is a priority such that these factors carry higher weights in the user rating analysis.

In other embodiments, user rating score can be determined using the probability outputs of the acceptance, durational, and/or quality analyses where the probabilities are multiplied by a predetermined weights assigned by a provider, such as multiplying the probability that a user will be a long-term account holder by a provider-assigned weight. The weights can be selected to emphasize or de-emphasize factors selected by the provider, such as reducing weights for short-term users to reduce the user rating score for such users.

The output of the user rating analysis may be a user rating score between 0 and 1 (or other boundary values) that allows a provider to rate and compare different users. The user resource evaluation service performs an acceptance analysis using the user rating score, resource initialization parameter data, and/or the outputs of the acceptance, durational, and quality analysis to determine resource initialization data displayed to a user as part of an electronic offer campaign.

To illustrate, a provider can specify resource initialization parameter data that includes a minimum user rating threshold. The rules engine then includes software code to implement a rule where only customers with a user rating score above the minimum user rating threshold will be extended an offer in the form of resource initialization data. In this manner, the provider can ensure that provider resources are not unnecessarily expended on categories of users that the provider is not interested in accepting.

The rules engine can include rules that process other resource initialization parameter data specified as part of electronic offer campaign design. As a further example, the provider can design an electronic campaign such that users with a user rating score above a specified threshold should be incentivized to the point where such users show at least a ten percent (10%) probability of accepting an offer. The desired threshold value and the (10%) ten percent acceptance rate are stored as part of the resource initialization parameter data. When the user rating score for a user is above the desired threshold value, the acceptance analysis is run on various offer amounts (e.g., $100, $200, etc.) until the acceptance probability reaches 10%. The campaign manner then transmits the offer to the web server to he presented to the user as resource initialization display data, or alternatively, transmits a recommended offer to a provider employee for review and approval. Again, determining offers in this manner ensures that offers are optimized such that the offer is not more than is required to incentivize the user.

Figure 7:
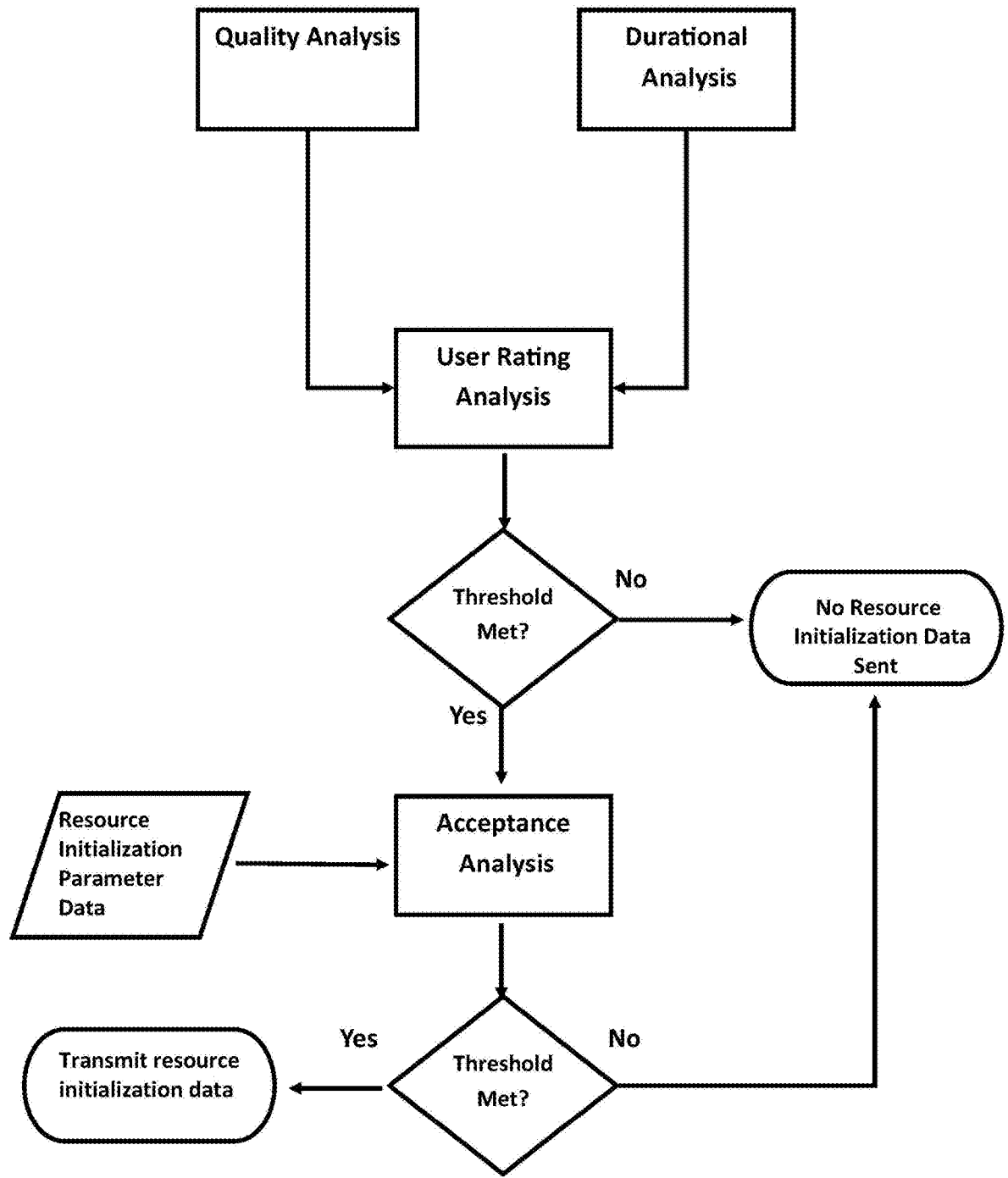
FIG. 7 is a flow chart representing a method for processing user evaluation data according to at least one embodiment.
Figure 8:
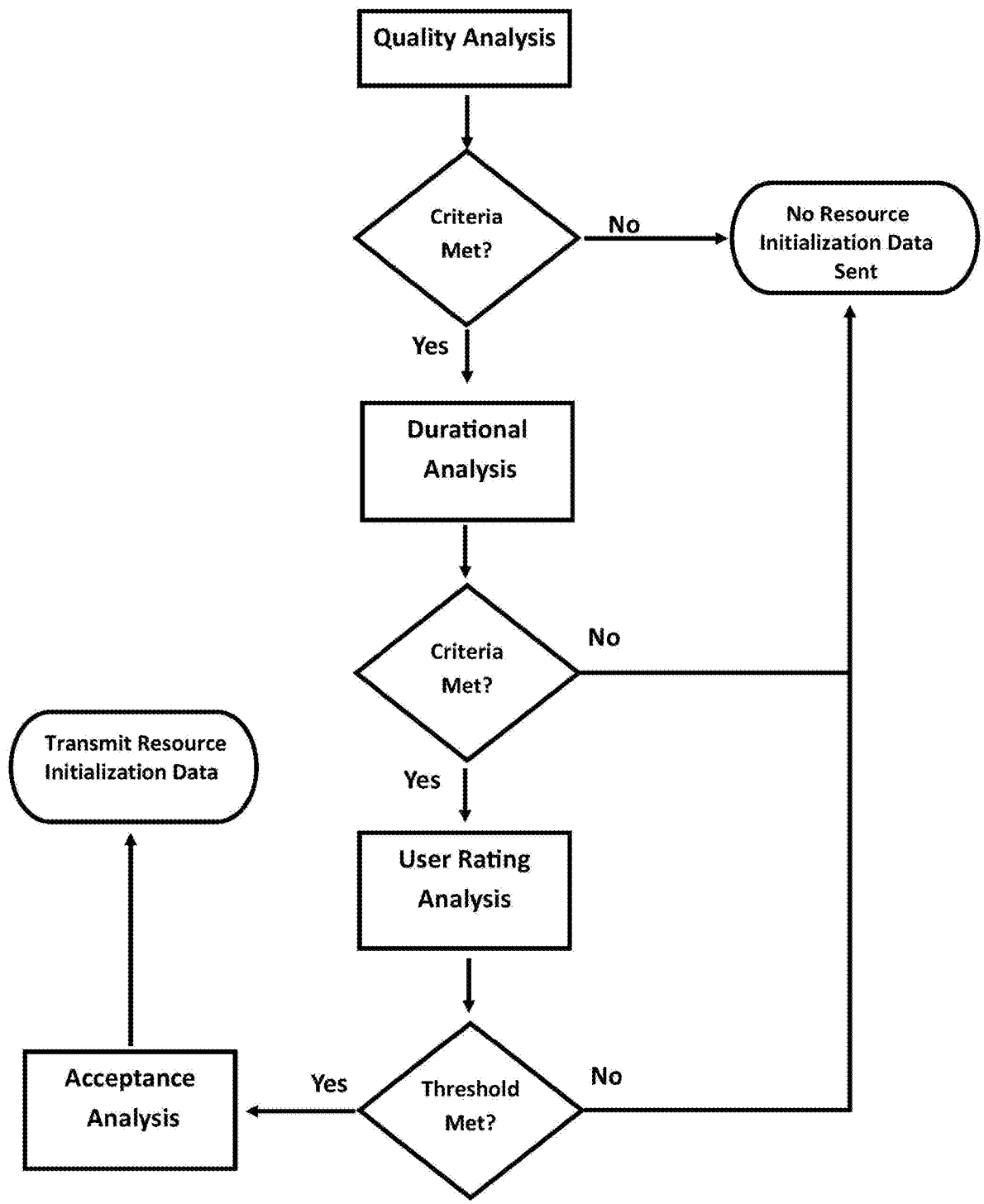
FIG. 8 is a flow chart representing a method for processing user evaluation data according to at least one embodiment.

Example processes implemented by the user resource evaluation service for generating an electronic campaign offer are illustrated in FIGS. 7 and 8. With reference to FIG. 7, the process begin with conducting a quality analysis and a durational analysis using the user evaluation data that can include navigation data, system configuration data, and user account data. The results of the quality analysis and durational analysis are fed to the user rating analysis to determine a user rating score.

The user resource evaluation service compares the calculated user rating score against a minimum user rating threshold stored as part of the resource initialization parameter data. If the minimum user rating threshold is not met, then no offer is generated. If the minimum threshold is met, then the user resource evaluation service performs an acceptance analysis using resource initialization parameter data that can include a range of permitted offers or permitted initialization data (e.g., monetary amounts or interest rate incentives) and a minimum acceptance probability threshold (i.e., a target probability for accepting an offer set by the provider). If there are no permitted offers that meet the minimum acceptance probability threshold, then no resource initialization data is generated and transmitted to the user computing device On the other hand, if one or more permitted offers do meet the minimum acceptance probability threshold, then one such permitted offer is selected, formatted as resource initialization data, and transmitted to the web server for transmission to the user computing device as part of the resource initialization display data. The selection of resource initialization data can be performed according to predefined criteria, such as automatically selecting the smallest monetary offer that meets the minimum acceptance probability threshold. In other embodiments, the resource initialization data is selected to optimizes the acceptance probability and the use of provider resources, such as: (i) selecting the resource initialization data with the highest probability of acceptance, or (ii) determining when increasing the value of the resource initialization data amount does not raise the acceptance probability above a predetermined threshold so that the provider knows that increasing the amounts has a diminished return on investment (e.g., increasing the offer does not raise the acceptance probability by more than 1%).

In other embodiments, as illustrated in FIG. 8, the user resource evaluation service can perform a sequential analysis that first performs a quality or durational analysis. After each analysis, the user resource evaluation service determines if predefined criterial are met, such as only generating resource initialization data for long-term or high-quality users. Thus, the user resource evaluation service processing is streamlined such that the user rating and acceptance analysis are only performed for users that have already been screened as meeting defined criteria.

Figure 9:
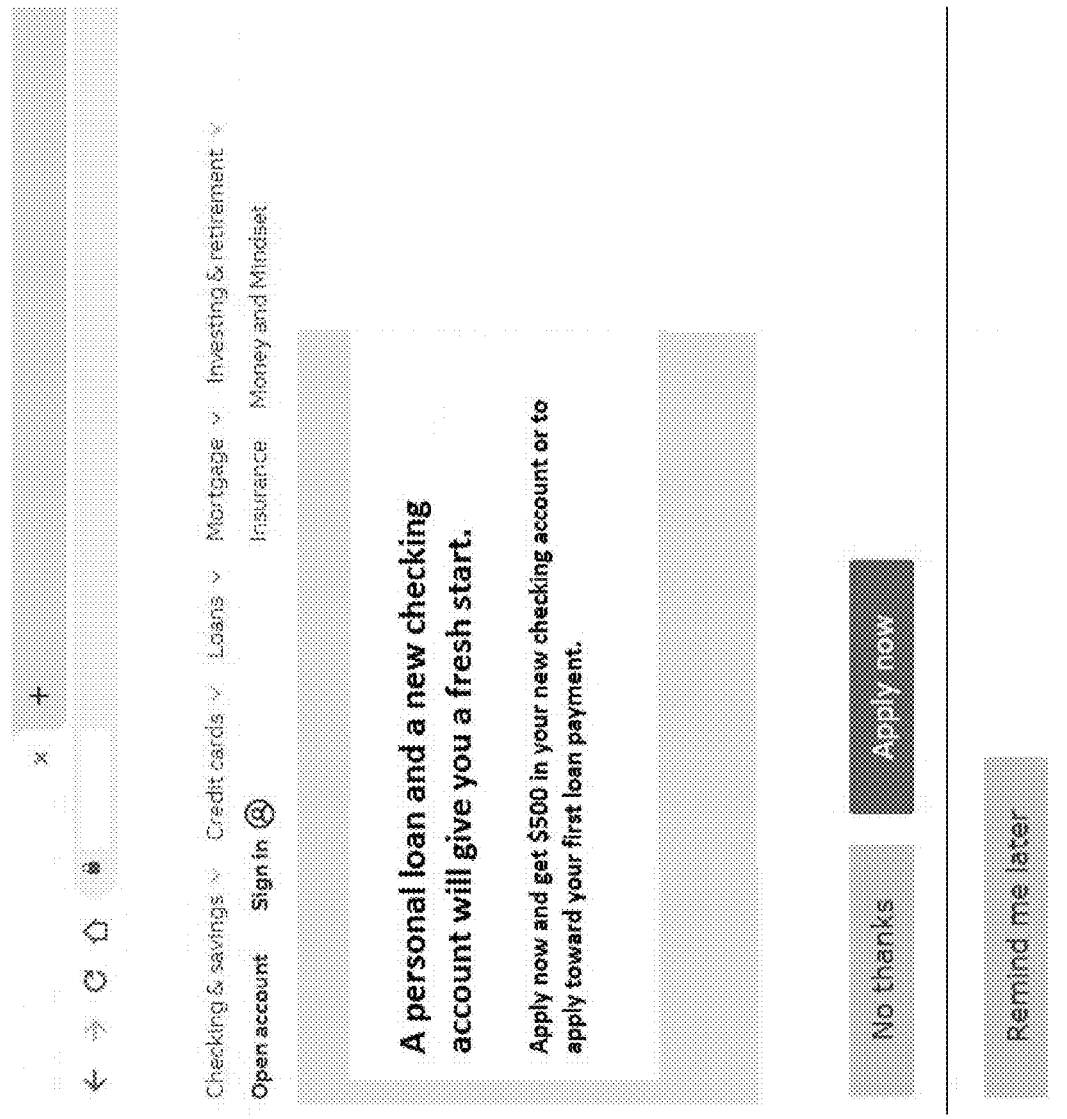
FIG. 9 is an example graphical user interface according to at least one embodiment.

An example user interface for displaying resource initialization data is depicted in FIG. 9. Once resource initialization data is generated by the campaign manager or approved by a provider employee, the resource initialization data is transmitted to the provider web server for inclusion as part of the resource initialization display data. The resource initialization display data includes alphanumeric text with a specified font and color that describes the offer, such as the text shown in FIG. 9 inviting a user to "Apply now and get $500." The resource initialization display data can also incorporate images, graphics, and layout data that instruct the user computing device to render various graphical elements in a specified arrangement.

Functions or links for accepting or declining an offer of resource initialization data can also be included with the resource initialization display data, such as the "No thanks" and "Apply now" buttons shown in FIG. 9. Selecting the function to accept resource initialization data can redirect the user computing device to a webpage or mobile app GUI for completing an electronic-application for a new product or account that is associated with the resource initialization data, such as an account application user interface.

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A system for optimizing resource utilization comprising at least one server computing device, wherein the server computing device comprises one or more integrated software applications that perform the operations comprising:
   (a) receiving from a user computing device (i) a user interface transmit command, (ii) user computing device system configuration data, (iii) navigation data, and (iv) authentication data;
   (b) passing the received authentication data to an identity management service that performs operations comprising
       (i) verifying the user authentication data by comparing the received user authentication data against stored user authentication data,
       (ii) generating an authentication notification message comprising a verification flag indicating whether the received user authentication data matched the stored user authentication data, and
       (iii) passing the authentication notification message to the server computing device;
   (c) passing user account data to a user resource evaluation service when the verification flag indicates the received user authentication data matched the stored user authentication data;
   (d) passing the navigation data and the system configuration data to the user resource evaluation service, wherein the user resource evaluation service performs operations comprising (i) processing the navigation data, the system configuration data, and the user account data by performing a durational analysis and a quality analysis to generate user classification data, (ii) processing the user classification data by performing a user rating analysis to generate user rating data, (iii) comparing the user rating data against a user rating threshold, (iv) processing resource initialization parameter data and the navigation data, the system configuration data, and the user account data by performing an acceptance analysis to generate resource initialization data, and (v) passing the resource initialization data to the server computing device; and (e) generating resource initialization display data by processing the resource initialization data, wherein (i) the resource initialization display data comprises instructions for displaying both the resource initialization data and a resource utilization function on a graphical user interface of the user computing device, and wherein (ii) selecting the resource initialization function causes the user computing device to display an account application user interface that accepts user inputs to initialize an end user account.

2. The system for optimizing resource utilization of claim 1, wherein:
(a) the user resource evaluation service comprises at least one neural network; and
(b) the at least one neural network is used to perform the durational analysis, the quality analysis, and the acceptance analysis.

3. The system for optimizing resource utilization of claim 2, wherein the at least one neural network comprises a support vector machine.

4. The system for optimizing resource utilization of claim 2, wherein the at least one neural network comprises a convolutional neural network.

5. The system for optimizing resource utilization of claim 2, wherein the server computing device performs the further operations comprising:
(a) receiving resource initialization decision data transmitted by the user computing device;
(b) creating a historical resource initialization database record comprising the navigation data, the system configuration data, the user account data, and the resource initialization decision data;
(c) processing the historical resource initialization database record by performing a labeling analysis to generate known labeling data;
(d) processing the historical resource initialization database record using the at least one neural network by performing the acceptance analysis to generate training decision data;
(e) generating an error rate by (i) comparing the classification data to the known labeling data, and (ii) comparing the training decision data to the resource initialization decision data; and
(f) training the at least one neural network by adjusting one or more neural network parameters to reduce the error rate.

6. The system for optimizing resource utilization of claim 2, wherein the server computing device performs the further operations comprising:

(a) processing the navigation data, the system configuration data, and the user account data by performing a labeling analysis to generate known labeling data;
(b) generating an error rate by comparing the classification data to the known labeling data, and
(c) training the at least one neural network by adjusting one or more neural network parameters to reduce the error rate.

7. The system for optimizing resource utilization of claim 1, wherein:
(a) the user resource evaluation service comprises a first neural network, wherein the first neural network is used to perform the durational analysis;
(b) the user resource evaluation service comprises a second neural network, wherein the second neural network is used to perform the quality analysis; and
(c) the user resource evaluation service comprises a third neural network, wherein the third neural network is used to perform the acceptance analysis.

8. The system for optimizing resource utilization of claim 1, wherein:
(a) the server computing device transmits the resource initialization display data to the user computing device;
(b) the graphical user interface comprises a website; and
(c) the user computing device processes the resource initialization display data to display the resource initialization data on the website.

9. The system for optimizing resource utilization of claim 1, wherein:
(a) the server computing device transmits the resource initialization display data to the user computing device; and
(b) the graphical user interface comprises a user interface screen for a mobile software application.

10. The system for optimizing resource utilization of claim 1, wherein:
(a) the resource initialization data comprises a provider account type identifier;
(b) the server computing device transmits the resource initialization display data to the user computing device;
(c) the user computing device processes the resource initialization display data to generate the graphical user interface, wherein (i) the graphical user interface comprises a hyperlink, and (ii) selecting the hyperlink displays the account application user interface.

11. A system for optimizing resource utilization comprising at least one server computing device, wherein the server computing device comprises one or more integrated software applications that perform the operations comprising:
(a) receiving from a user computing device, (i) a user interface transmit command for user interface data utilized by the user computing device to generate a graphical user interface, and
(ii) user evaluation data;
(b) passing the user evaluation data to a user resource evaluation service, wherein the user resource evaluation service comprises at least one neural network, and wherein the user resource evaluation service performs operations comprising
(i) processing the user evaluation data using the at least one neural network to generate user classification data,
(ii) processing the user classification data by performing a user rating analysis to generate user rating data,
(iii) comparing the user rating data against a user rating threshold, and (iv) processing resource initialization parameter data and the user evaluation data to generate resource initialization data; and (c) generating resource initialization display data by processing the resource initialization data, wherein
  (i) the resource initialization display data comprises instructions for displaying both the resource initialization data and a resource utilization function on the graphical user interface of the user computing device
  (ii) selecting the resource initialization function causes the user computing device to display an electronic account application user interface that accepts user inputs to initialize an end user account.

12. The system for optimizing resource utilization of claim 11, wherein the user evaluation data comprises navigation data and system configuration data.

13. The system for optimizing resource utilization of claim 11, wherein the at least one neural network comprises a support vector machine.

14. The system for optimizing resource utilization of claim 11, wherein the at least one neural network comprises a convolution neural network.

15. A method for optimizing resource utilization comprising the steps of:
  (a) receiving by a web server from a user computing device, (i) a user interface transmit command for display data utilized by the user computing device to generate a graphical user interface, (ii) navigation data, and (iii) user authentication data;
  (b) transmitting by the web server, the received user authentication data to an identity management service that verifies the user authentication data by comparing the received user authentication data against stored user authentication data;
  (c) receiving by a user resource evaluation service, the navigation data and user account data, wherein the user resource evaluation service comprises at least one neural network and at least one rules engine software application;
  (d) performing by the user resource evaluation service, the operations comprising
    (i) processing the navigation data and the user account data using the at least one neural network to generate user classification data,
    (ii) processing the user classification data using the rules engine software application by comparing the user classification data against classification threshold data,
    (iii) processing the user classification data by performing a user rating analysis to generate user rating data,
    (iv) comparing the user rating data against a user rating threshold, and
    (v) processing resource initialization parameter data, the navigation data, and the user account data by performing and acceptance analysis to generate resource initialization data;
  (e) generating by the web server, resource initialization display data by processing the resource initialization data, wherein
    (i) the resource initialization display data comprises machine-readable instructions for displaying both the resource initialization data and a resource initialization function on the graphical user interface of the user computing device, and wherein
    (ii) selecting the resource initialization function causes the user computing device to display an electronic account application user interface that accepts user inputs to initialize an end user account.

16. The method for optimizing resource utilization of claim 15, wherein the at least one neural network comprises a support vector machine.

17. The method for optimizing resource utilization of claim 15, wherein the at least one neural network comprises a convolutional neural network.

18. The method for optimizing resource utilization of claim 15, wherein:
  (a) the web server transmits the resource initialization display data to the user computing device;
  (b) the graphical user interface comprises a website; and
  (c) the user computing device processes the resource initialization display data to display the resource initialization data on the website.

19. The method for optimizing resource utilization of claim 18, wherein:
  (a) the web server transmits the resource initialization display data to the user computing device;
  (b) the user computing device processes the resource initialization display data to generate the graphical user interface, wherein (i) the graphical user interface comprises a hyperlink, and (ii) selecting the hyperlink displays the electronic account application user interface.

* * * * *